(12) United States Patent
Zander

(10) Patent No.: US 11,292,110 B2
(45) Date of Patent: Apr. 5, 2022

(54) POWER SCREW DRIVER WITH SCREW PICK-UP FEATURE

(71) Applicant: ATLAS COPCO INDUSTRIAL TECHNIQUE AB, Stockholm (SE)

(72) Inventor: Hans Johan Alfred Zander, Värmdö (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 340 days.

(21) Appl. No.: 16/614,303

(22) PCT Filed: May 4, 2018

(86) PCT No.: PCT/EP2018/061463
§ 371 (c)(1),
(2) Date: Nov. 15, 2019

(87) PCT Pub. No.: WO2018/210584
PCT Pub. Date: Nov. 22, 2018

(65) Prior Publication Data
US 2021/0154812 A1   May 27, 2021

(30) Foreign Application Priority Data
May 16, 2017 (SE) .................................. 1730135-9

(51) Int. Cl.
*B25B 23/08* (2006.01)
*B25B 21/00* (2006.01)

(52) U.S. Cl.
CPC ............ *B25B 23/08* (2013.01); *B25B 21/002* (2013.01)

(58) Field of Classification Search
CPC ....... B25B 23/08; B25B 21/002; B25B 17/02; B25B 21/00; B25B 23/065; B25B 23/06;
(Continued)

(56) References Cited

U.S. PATENT DOCUMENTS

| 3,786,845 A | 1/1974 | States |
| 4,924,732 A * | 5/1990 | Hoskins ................. B25B 21/00 81/451 |

(Continued)

FOREIGN PATENT DOCUMENTS

| EP | 0239698 A2 | 10/1987 |
| WO | 2009022420 A1 | 2/2009 |

OTHER PUBLICATIONS

International Search Report (ISR) and Written Opinion of the International Searching Authority dated Aug. 9, 2018 issued in International Application No. PCT/EP2018/061463.
(Continued)

*Primary Examiner* — Robert J Scruggs
(74) *Attorney, Agent, or Firm* — Holtz, Holtz & Volek PC

(57) ABSTRACT

A power screw driver includes a housing with a vacuum chamber communicating with a source of sub-atmospheric pressure, a motor, a drive spindle, a screw engaging bit connected to the drive spindle, a suction nozzle surrounding and being rigidly secured to the bit, and a bit supporting sleeve having a forward end part and a rear end part. The rear end part of the bit supporting sleeve is connected to the drive spindle and extends into the vacuum chamber. The forward end part of the bit supporting sleeve in contact with the suction nozzle. At least one longitudinal internal passage extends through the bit supporting sleeve and is arranged to communicate sub-atmospheric pressure from the vacuum chamber to the suction nozzle.

4 Claims, 2 Drawing Sheets

(58) Field of Classification Search
CPC ....... B25B 23/045; B25B 23/04; B25B 23/02; B25B 23/10; B25B 23/101; B25B 23/103; B25B 23/105; B25B 23/106; B25B 23/108; B23P 19/069; B23P 19/06
See application file for complete search history.

(56) References Cited

U.S. PATENT DOCUMENTS

| | | |
|---|---|---|
| 6,418,818 B1 | 7/2002 | Tham et al. |
| 8,671,803 B2 * | 3/2014 | Katsunuma ............. B25B 23/00 81/54 |
| 9,737,979 B1 * | 8/2017 | Sungkhaphong ....... B25B 23/08 |

OTHER PUBLICATIONS

Chinese Office Action dated Dec. 16, 2020 issued in Chinese Application No. 201711122890.3.

* cited by examiner

FIG 1
FIG 2
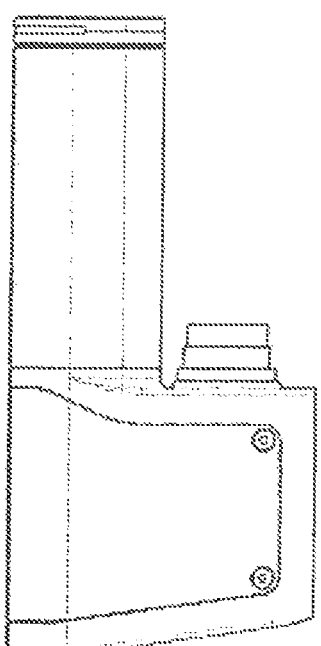
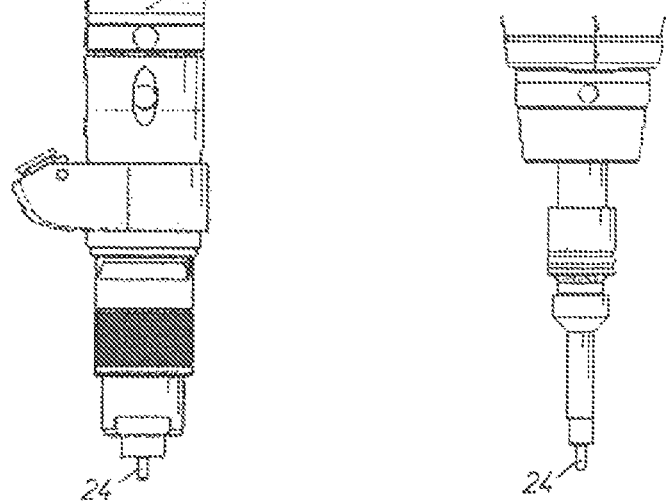
FIG 4
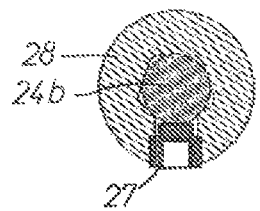
FIG 5
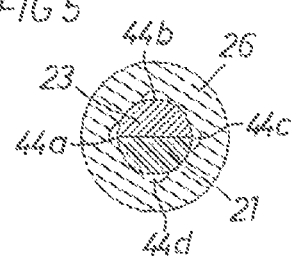
FIG 6
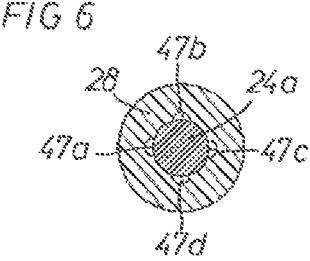

POWER SCREW DRIVER WITH SCREW PICK-UP FEATURE

The invention relates to a power screw driver having a screw pick-up feature.

In particular, the invention concerns a power screw driver having a vacuum activated screw pick-up device by which a screw to be mounted is brought into engagement with the bit in a pre-tightening sequence. A screw driver of this type comprises a housing, a motor drivingly connected to a drive spindle, a screw engaging bit connected to the drive spindle, a bit supporting sleeve connected to the drive spindle, and a bit surrounding suction nozzle, wherein the housing comprises a vacuum chamber which communicates on one side with a source of sub-atmospheric pressure and on the other side with the suction nozzle.

In prior art power screw drivers of the above type there is a problem to get access to narrow or cramped screw locations. This is due to the fact that in those tools the housing including the vacuum chamber reaches a forwardly extended position where the vacuum chamber communicates directly to the bit surrounding suction nozzle. This means that the relatively wide forward part of the housing easily abuts against structure parts surrounding the screw location thereby obstructing the bit from reaching the screw to be tightened. Accordingly, the housing and vacuum chamber arrangement of prior art screw drivers is disadvantageous as it creates a limitation as to the accessibility to narrow or cramped screw positions.

Another problem inherent in prior art power screw drivers with vacuum screw pick-up features is that the bit surrounding suction nozzle is rigidly attached to the housing via the vacuum chamber, which means that during tightening of a screw there will always be a relative rotation between the bit and the suction nozzle. This tends to make the screw wobble and easily loose its contact with the bit and eventually fall out, thereby causing an undesirable process interruption. In particular, this would happen if the screw head has got some geometrical irregularities. Relative rotation between the bit and the suction nozzle would also cause friction forces which tend to affect the quality of the tightening process.

The above problems will be solved and overcome by a power screw driver according to the invention as it is defined in the claims. The solution to the first identified problem is obtained by providing by a power screw driver comprising a housing including a vacuum chamber connected to source of sub-atmospheric pressure, a motor drivingly connected to a drive spindle, a screw engaging bit connected to the drive spindle, a bit surrounding suction nozzle, and a bit supporting sleeve having a rear end part connected to the drive spindle and surrounded by the vacuum chamber and a forward part in contact with the suction nozzle, wherein the bit supporting sleeve is provided with at least one longitudinal internal passage extending from the rear end part to the forward end part and arranged to communicate sub-atmospheric pressure from the vacuum chamber to the suction nozzle.

A solution to the second identified problem is obtained by providing a power screw driver comprising a housing with a vacuum chamber connected to source of sub-atmospheric pressure, a motor drivingly connected to a drive spindle, a screw engaging bit connected to the drive spindle, a bit supporting sleeve connected to the drive spindle, and a suction nozzle surrounding the bit, wherein the suction nozzle is rigidly secured to and co-rotating with the bit.

Further characteristics and advantages of the invention will appear from the following specification and claims.

A preferred embodiment of the invention is below described in detail with reference to the accompanying drawing.

In the Drawing

FIG. 1 shows a side view of a prior art screw driver.

FIG. 2 shows a side view of forward end part of a power screw driver according to the invention.

FIG. 4 shows on a larger scale a cross section along line B-B in FIG. 3.

FIG. 5 shows on a larger scale a cross section along line A-A in FIG. 3.

FIG. 6 shows on a larger scale a cross section along line C-C in FIG. 3.

Figure 3:
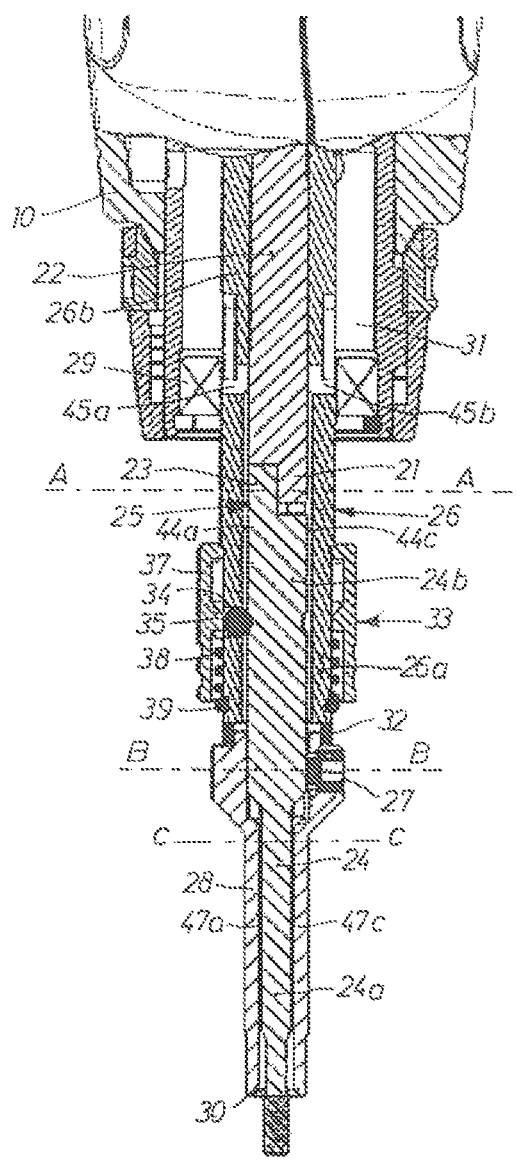
FIG. 3 shows, on a larger scale, a longitudinal section through the forward end of a power screw driver according to the invention.

The power screw driver illustrated in the drawing figures comprises a housing designed to be supported on a fixture and having at its forward output end a vacuum activated screw pick-up device. The housing is also provided with a means for connecting the screw driver to a power supply and for connecting the screw pick-up device to a source of sub-atmospheric pressure.

At its forward end the screw driver carries a screw engaging bit surrounded by a suction nozzle for picking up and holding a screw to be mounted and tightened. As illustrated in FIG. 1 the prior art power screw driver the housing extends to a position rather close to the output end of the screw engaging bit, and the suction nozzle is rigidly secured to the housing. This means that in mounting and tightening screws in narrow and difficult to reach positions the housing easily gets into contact with structure parts adjacent the intended screw position thereby obstructing the screw driver from being used in such positions.

In comparison to the prior art power screw driver illustrated in FIG. 1 the screw driver according to the invention illustrated in FIG. 2 has a much slimmer design of the forward end section and presents a solution to the above mentioned problem.

In detail the forward end section of the screw driver according to the invention, as illustrated in FIG. 2, comprises a vacuum chamber 31 forming a part of the housing 10, and a drive spindle 22 connected to the motor and extending through the vacuum chamber 31. The drive spindle 22 is connected to a screw engaging bit 24 via a half-moon coupling 25 for transferring a tightening torque to a screw being tightened. The bit 24 is of a standard type and comprises a small diameter forward portion 24a and a rear portion 24b of a larger diameter, wherein the forward bit portion 24a is formed with a grip pattern suitable for engaging the screw being actually used. The rear bit portion 24b is formed with one half 23 of the half-moon coupling 25, whereas a matching other half 21 of the half-moon coupling 25 is formed on the drive spindle 22. A tubular suction nozzle 28 surrounds the forward bit portion 24a and is locked against rotation relative to the bit by a locking device in the form of a screw 27. This locking device ensures that the suction nozzle 28 is not only axially locked to but co-rotating with the bit 24 during tightening operations. At its forward end the suction nozzle 28 is formed with a socket portion 30 for receiving and supporting the head of a screw having been picked up.

By locking the suction nozzle 28 against rotation relative to the bit 24 there is ensured that a screw being picked up and having its head received in the socket portion 30 will not be frictionally affected by the nozzle 28 at rotation of the bit 24 but will prevent the screw from losing its correct orientation and, thereby, impair the mounting and tightening process.

A tubular bit supporting sleeve 26 is rigidly secured to the drive spindle 22 via a press fit and is supported itself relative to the housing 10 via bearing 29 The bit supporting sleeve 26 comprises a forward end part 26a and a rear end part 26b, wherein the forward end part 26a surrounds the rear large diameter bit portion 24b. The rear end part 26b of the bit supporting sleeve 26 is surrounded by a vacuum chamber 31 which is formed as a part of the housing 10 and which communicates with an external source of sub-atmospheric pressure. The forward end part 26a of the bit supporting sleeve 26 is in endwise contact with the suction nozzle 28 via a seal ring 32.

The bit 24 is axially locked to the bit supporting sleeve 26 by means of a ball latch 33 comprising a ball 35 which is located in an aperture 34 in the bit supporting sleeve 26 and arranged to co-operate with an annular groove 36 in the rear bit portion 24b. The ball 35 may be shifted between lock and release positions by a maneuver ring 37 which is arranged to be axially displaced on the outside of the bit supporting sleeve 26. A spring 38 is provided to bias the maneuver ring 37 into a locking position, wherein the ball 35 is positively kept in its locking engagement with the groove 36. The spring 38 is axially supported by a lock ring 39 mounted on the bit supporting sleeve 26.

Moreover, the bit supporting sleeve 26 is provided with four longitudinal internal air passages 44 a-d extending from in the rear end part 26b to the forward end part 26a to communicate with four internal passages 47 a-d in the suction nozzle 28. The passages 44 a-d communicates with the vacuum chamber 31 via a couple of lateral openings 45a and 45b. The passages 47 a-d in the suction nozzle 28, the passages 44 a-d and the lateral openings 45 a,b in the bit supporting sleeve 26 form an air communication path which connects the suction nozzle 28 to an external source of sub-atmospheric pressure via the vacuum chamber 31. The arrangements of the passages 44 a-d a in the bit supporting sleeve 26 are illustrated in FIGS. 4 and 5, whereas and the four passages 47 a-d in the suction nozzle 28 are illustrated in FIG. 6.

By having the bit 24 mounted at the forward end of the bit supporting sleeve 26 and providing a communication of sub-atmospheric pressure to the suction nozzle 24 via internal passages 44 a-d in the bit supporting sleeve 26 it has been possible to locate the suction nozzle 28 at an axial distance from the vacuum chamber 31 and, hence, the housing 10, thereby accomplishing a slim forward end section of the screw driver. This means that access to screws located in narrow and difficult to reach positions has been very much facilitated, because the screw driver is not obstructed by the housing interfering with structure parts adjacent such screw locations.

It is to be understood that the invention is not limited to the illustrated and described example but may be freely varied within scope of the claims. For instance, locking of the suction nozzle 28 against relative rotation to the bit 24 for obtaining a co-rotation of the suction nozzle 18 may be obtained otherwise. An alternative arrangement would be to secure the suction nozzle 28 to the bit supporting sleeve 26. That would make it possible to provide an alternative type of seal element 40 between the bit support sleeve 26 and the suction nozzle 28.

Neither is the invention applicable on mechanically supported screw drivers only but may as well be applied on manually supported screw drivers.

The invention claimed is:

1. A power screw driver, comprising:
   a housing having a vacuum chamber arranged to communicate with a source of sub-atmospheric pressure;
   a motor;
   a drive spindle;
   a screw engaging bit connected to the drive spindle;
   a suction nozzle surrounding a forward bit portion; and
   a bit supporting sleeve having a forward end part surrounding a rear bit portion and a rear end part connected to the drive spindle;
   wherein:
   the rear end part of the bit supporting sleeve is surrounded by the vacuum chamber,
   the forward end part of the bit supporting sleeve is in endwise contact with the suction nozzle via a seal element such that there is no axial overlap between the bit supporting sleeve and the suction nozzle,
   the suction nozzle comprises least one longitudinal internal passage arranged in an inner surface of the suction nozzle,
   the bit supporting sleeve comprises at least one longitudinal internal passage arranged in an inner surface of the bit supporting sleeve and extending from the rear end part to the forward end part of the bit supporting sleeve to communicate with the at least one longitudinal internal passage in the suction nozzle, and
   the at least one longitudinal internal passage of the bit supporting sleeve extends from the vacuum chamber to the suction nozzle.

2. The power screw driver according to claim 1, wherein the suction nozzle is secured by a locking device for co-rotation with the screw engaging bit.

3. The power screw driver according to claim 1, wherein:
   the screw engaging bit has a small diameter forward end part and a large diameter rear end part, and
   the rear end part extends into the bit supporting sleeve and is provided with a coupling part for engagement with a matching coupling part of the drive spindle.

4. The power screw driver according to claim 2, wherein:
   the screw engaging bit has a small diameter forward end part and a large diameter rear end part, and
   the rear end part extends into the bit supporting sleeve and is provided with a coupling part for engagement with a matching coupling part of the drive spindle.

* * * * *